US012662008B2

(12) United States Patent
Zoon et al.

(10) Patent No.: US 12,662,008 B2
(45) Date of Patent: Jun. 23, 2026

(54) ELECTRIC VEHICLE CHARGING SYSTEM

(71) Applicant: ABB E-MOBILITY B.V., Delft (NL)

(72) Inventors: Wiebe Zoon, Delft (NL); Francisco Garcia-Ferre, Baden (CH); Lilian Kaufmann, Birmenstorf (CH); Pedram Kheiri, Hausen (CH); Stefan Raaijmakers, Delft (NL); Ali Ugur, The Hague (NL)

(73) Assignee: ABB E-Mobility, Delft (NL)

( * ) Notice: Subject to any disclaimer, the term of this patent is extended or adjusted under 35 U.S.C. 154(b) by 701 days.

(21) Appl. No.: 17/886,670

(22) Filed: Aug. 12, 2022

(65) Prior Publication Data

US 2023/0051961 A1 Feb. 16, 2023

(30) Foreign Application Priority Data

Aug. 13, 2021 (EP) ..................................... 21191165

(51) Int. Cl.
| | |
|---|---|
| *B60L 53/302* | (2019.01) |
| *B60L 53/16* | (2019.01) |
| *B60L 53/18* | (2019.01) |
| *C02F 1/00* | (2023.01) |
| *C02F 103/02* | (2006.01) |
| *H02J 7/70* | (2026.01) |

(52) U.S. Cl.
CPC ............. *B60L 53/302* (2019.02); *B60L 53/16* (2019.02); *B60L 53/18* (2019.02); *C02F 1/008* (2013.01); *H02J 7/70* (2026.01); *C02F 2103/023* (2013.01); *C02F 2209/05* (2013.01)

(58) Field of Classification Search
CPC ........ B60L 53/302; B60L 53/18; H02J 7/0042

USPC .......................................................... 320/109
See application file for complete search history.

(56) References Cited

U.S. PATENT DOCUMENTS

| | | | |
|---|---|---|---|
| 8,246,817 B2 * | 8/2012 | Kumar .............. | H01M 8/04044 |
| | | | 210/287 |
| 8,806,882 B2 | 8/2014 | Bennion et al. | |
| 10,029,575 B2 | 7/2018 | Remisch | |

(Continued)

FOREIGN PATENT DOCUMENTS

| | | |
|---|---|---|
| CN | 1703797 A | 11/2005 |
| CN | 110600168 A | 12/2019 |

(Continued)

OTHER PUBLICATIONS

European Patent Office, Third-Party Observations in European Patent Application No. 21191165.6, 14 pp. (Nov. 8, 2023).

(Continued)

*Primary Examiner* — Suchin Parihar
(74) *Attorney, Agent, or Firm* — McCarter & English, LLP

(57) ABSTRACT

An electric vehicle charging system includes a charging connector configured to receive a charging cable provided with electrical charging wires. The charging cable and/or the charging connector provide a flow path for guiding a liquid coolant, cooling the charging cable and/or the charging connector, and a thermal management unit for cooling the liquid coolant, the thermal management unit being fluidly connected to the flow path. The liquid coolant is an ionizable coolant, wherein a deionizing unit is provided and fluidly connected to the flow path for deionizing the liquid coolant to decrease its conductivity.

11 Claims, 2 Drawing Sheets

(56) References Cited

U.S. PATENT DOCUMENTS

| | | | | |
|---|---|---|---|---|
| 10,081,262 | B2 | 9/2018 | Nagel et al. | |
| 10,098,266 | B2 * | 10/2018 | Baerd | H05K 7/20927 |
| 10,109,395 | B2 | 10/2018 | Beimdieck et al. | |
| 10,784,035 | B2 * | 9/2020 | Ueda | B60L 53/122 |
| 2013/0267115 | A1 * | 10/2013 | Mark | B60L 53/18 |
| | | | | 439/485 |
| 2015/0217654 | A1 * | 8/2015 | Woo | B60L 53/18 |
| | | | | 320/109 |
| 2017/0088008 | A1 * | 3/2017 | Melendez | B60L 58/21 |
| 2017/0355245 | A1 * | 12/2017 | Bergweiler | B60H 1/00314 |
| 2018/0264957 | A1 | 9/2018 | Fuehrer et al. | |
| 2018/0304757 | A1 * | 10/2018 | Vaughan | B60L 53/305 |
| 2019/0074628 | A1 | 3/2019 | Fuehrer | |
| 2019/0315239 | A1 | 10/2019 | Beimdieck et al. | |
| 2019/0351771 | A1 | 11/2019 | Gale et al. | |
| 2020/0282851 | A1 | 9/2020 | Sasaridis et al. | |

FOREIGN PATENT DOCUMENTS

| | | | |
|---|---|---|---|
| CN | 113471479 | A | 10/2021 |
| DE | 102010050562 | B3 | 4/2012 |
| DE | 102011100389 | A1 | 5/2012 |
| DE | 102010007975 | B4 | 10/2012 |
| DE | 102016206300 | A1 | 10/2017 |
| DE | 102016117011 | A1 | 3/2018 |
| DE | 102018123455 | A1 | 3/2020 |
| JP | 2012-238532 | A | 12/2012 |
| WO | WO 2017/133893 | A1 | 8/2017 |
| WO | WO 2017/143295 | A1 | 8/2017 |
| WO | WO 2017/162464 | A1 | 9/2017 |
| WO | WO 2017/162494 | A1 | 9/2017 |
| WO | WO 2017/162532 | A1 | 9/2017 |
| WO | WO 2017/162651 | A1 | 9/2017 |
| WO | WO 2018/006903 | A1 | 1/2018 |
| WO | WO 2018/050724 | A1 | 3/2018 |
| WO | WO 2018/060151 | A1 | 4/2018 |
| WO | WO 2018/192805 | A1 | 10/2018 |
| WO | WO 2019/008047 | A1 | 1/2019 |
| WO | WO 2019/184883 | A1 | 10/2019 |

OTHER PUBLICATIONS

European Patent Office, Extended European Search Report in European Patent Application No. 21191165.6, 7 pp. (Feb. 7, 2022).

* cited by examiner

ELECTRIC VEHICLE CHARGING SYSTEM

CROSS-REFERENCE TO RELATED APPLICATIONS

This patent application claims priority to European Patent Application No. 21191165.6, filed on Aug. 13, 2021, which is incorporated herein in its entirety by reference.

FIELD OF THE DISCLOSURE

The present disclosure relates to an electric vehicle charging system for an electric vehicle.

BACKGROUND OF THE INVENTION

One limiting factor in charging cables for electric vehicles is the heat that is generated when high currents flow through the cable and the electrical connector from the charging station to the battery of a vehicle. For charge currents up to about 200 A a passive solution is possible with existing designs. Above 200 A the cable becomes too heavy to handle comfortably. A solution for this issue is to use a circulating cooling liquid to keep the temperature of the cable and the connector to the vehicle to an acceptable level. For circulating the coolant, additional devices such as pumps are necessary.

Prior art US 2019/0315239 A1 discloses an electrical contact element for a car charging plug connector. The electrical contact element has a contact part and a connection part, wherein the connection part can be connected to an electrical conductor of a cable. Cooling liquid can be delivered to the contact element. As a result, the heat produced on the contact element is extracted directly.

U.S. Pat. No. 10,109,395 B2 relates to a connection unit for a fluid-cooled cable and to a system composed of a plug-in connector, a fluid-cooled cable and a connection unit. The connection unit comprising a housing, which has a cable connecting opening, a fluid inlet opening and a fluid outlet opening.

US 2019/0074628 A1 relates to a plug-in connector part for plug-in connection to a mating plug-in connector part.

Prior art DE 10 2011 100 389 A1 discloses a charging cable for transferring electrical energy to an energy storage device of an electric or hybrid vehicle. The charging cable comprises a coolant-guiding device, which is arranged inside a cable jacket.

BRIEF SUMMARY OF THE INVENTION

In one general aspect, the present disclosure describes an electric vehicle charging system, which can be operated more economically, while providing high current rates.

According to the disclosure, an electric vehicle charging system comprising a charging connector configured to receive a charging cable provided with electrical charging wires. The charging cable and/or the charging connector provide a flow path for guiding a liquid coolant, cooling the charging cable and/or the charging connector, and a thermal management unit for cooling the liquid coolant, fluidly connected to the flow path. The liquid coolant is an ionizable coolant, wherein a deionizing unit is provided and fluidly connected to the flow path for deionizing the liquid coolant, to decrease the conductivity of the coolant.

The charging connector provides the charging current from a charging station to the battery of an electric vehicle. Thus, "charging connector" is understood to be a handheld device such as a charging gun or charging nozzle. The counterpart of the charging connector on vehicle-side is called socket. For charging the vehicle, the charging connector provides a charging cable. The charging cable thereby comprises several conduits like coolant conduits and charging wires for the electrical current to the vehicle. At least a part of the flow path is formed by the coolant conduits. For cooling the charging connector, the liquid coolant may be provided to the electric contacts of the charging connector. The thermal management unit is used for cooling the liquid coolant. Preferably, the thermal management unit is a heat exchanger.

BRIEF DESCRIPTION OF THE SEVERAL VIEWS OF THE DRAWING(S)

DETAILED DESCRIPTION OF THE INVENTION

Figure 1:
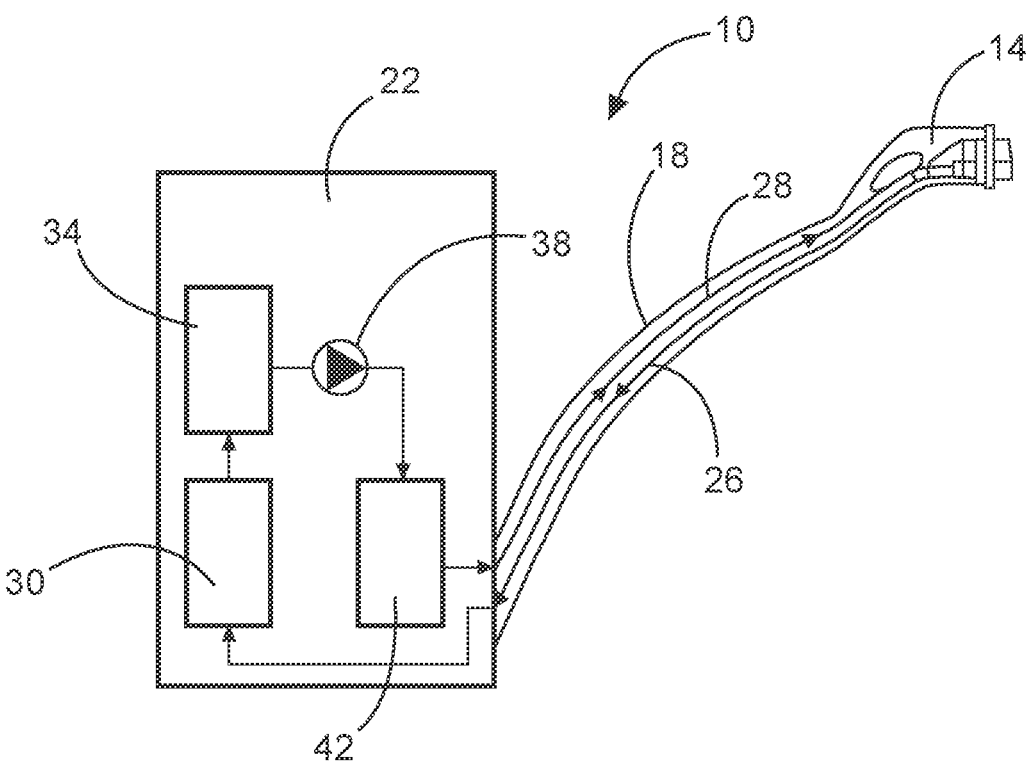
FIG. 1 is a schematic of an electric vehicle charging system according to a first embodiment of the present disclosure.

FIG. 1 shows an electric vehicle charging system 10 according to a first embodiment of the present invention. Such an electric charging system 10 comprises a charging connector 14, which has to be connected to a socket (not shown) of an electric vehicle for charging the battery. The charging connector 14 is connected with a charging cable 18, extending from a charging station 22. Inside the charging cable 18 a flow path 26, 28 is provided for guiding a liquid coolant to the charging connector 14 and to the charging station 22. The charging system 10 further comprises a thermal management unit 30, fluidly connected to the return flow path 26 of the charging cable 18 for cooling the liquid coolant. In this example, the thermal management unit 30 is provided as a heat exchanger.

In flow-direction downstream to the thermal management unit 30, a coolant tank 34 is arranged in the charging station 22. Downstream to the coolant tank 34 a coolant pump 38 is arranged for pumping the coolant along the flow path 26, 28. The coolant pump 38 is connected to a deionizing unit 42 for deionizing the liquid coolant. The deionizing unit 42 is fluidly connected to a supply flow path 28 of the charging cable 18. With the aforementioned arrangement, a cooling circuit is provided. In the first embodiment, the deionizing unit 42 is arranged in series with the thermal management unit 30.

Figure 2:
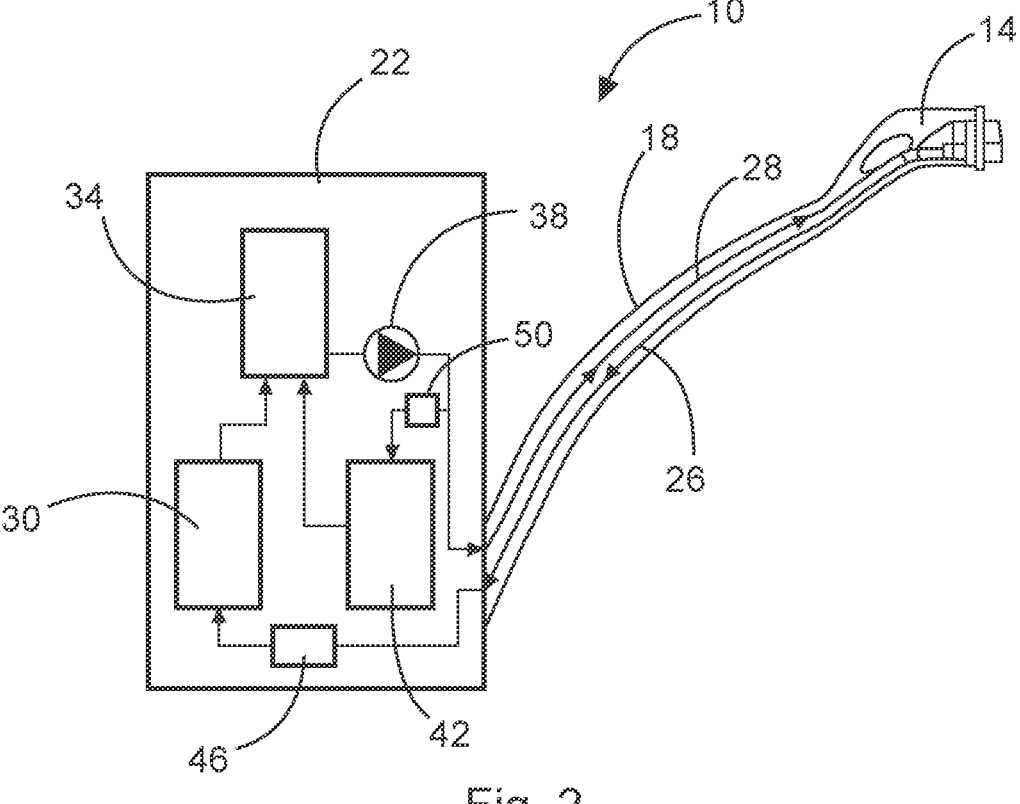
FIG. 2 is a schematic of an electric vehicle charging system according to a second embodiment of the present disclosure.

In FIG. 2, an electric vehicle charging system 10 according to a second embodiment of the present invention is shown. This embodiment differs to the first embodiment shown in FIG. 1 by the features that the thermal management unit 30 is arranged in parallel to the deionizing unit 42. In this embodiment, the coolant pump 38 is directly connected to the supply flow path 28. The deionizing unit 42 is fluidly connected to a fluid line between the coolant pump 38 and the supply flow path 28. The coolant exiting the deionizing unit 42 is directed to the coolant tank 34.

In the second embodiment between the return flow path
26 and the thermal management unit 30, a conductivity
measurement device 46 is arranged, with which the conduc-
tivity of the liquid coolant is measured. Based on the values
of the conductivity measurement device 46, the deionizing
unit 42 can be controlled or a service department can be
informed. The electric vehicle charging system 10 further
comprises a controlled valve 50, which is arranged upstream
of the deionizing unit 42. The flow rate thereby can be
controlled dependent of the conductivity value.

Figure 3:
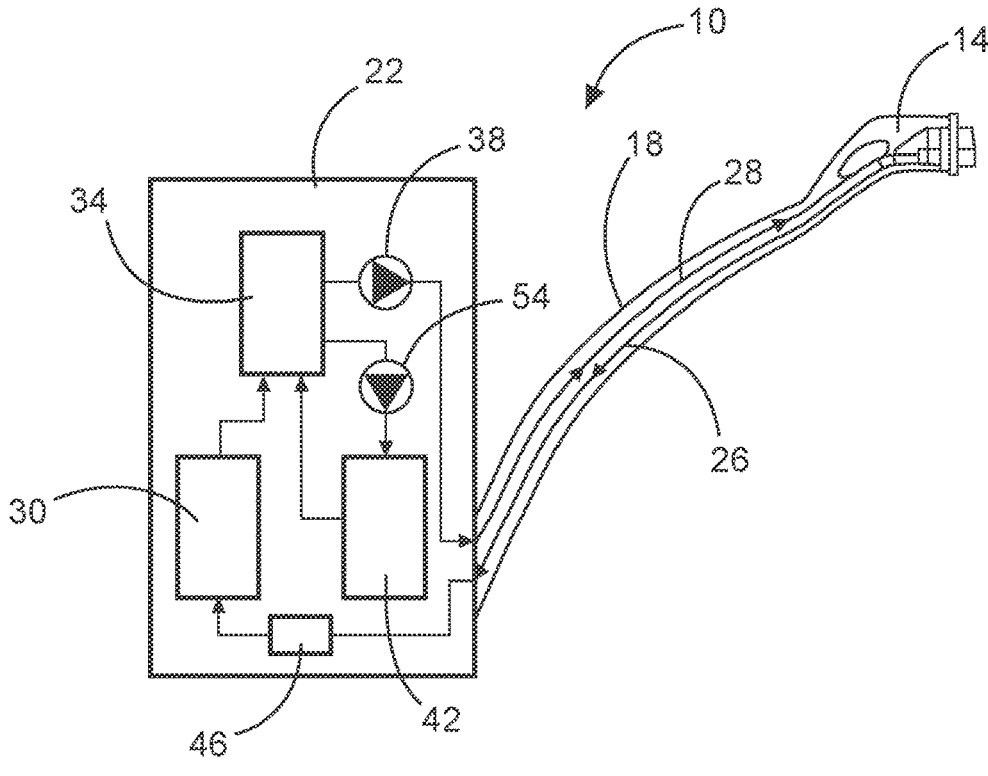
FIG. 3 is a schematic of an electric vehicle charging system according to a third embodiment of the present disclosure.

FIG. 3 shows an electric vehicle charging system 10
according to a third embodiment of the present invention.
This embodiment differs to the second embodiment shown
in FIG. 2 by the feature that a separate pump 54 for the
deionizing unit 42 is provided. In this embodiment, the
separate pump 54 is arranged upstream of the deionizing
unit 42 and downstream of the coolant tank 34. With this
arrangement, the deionizing unit 42 can run independently
of the cooling circuit.

Figure 4:
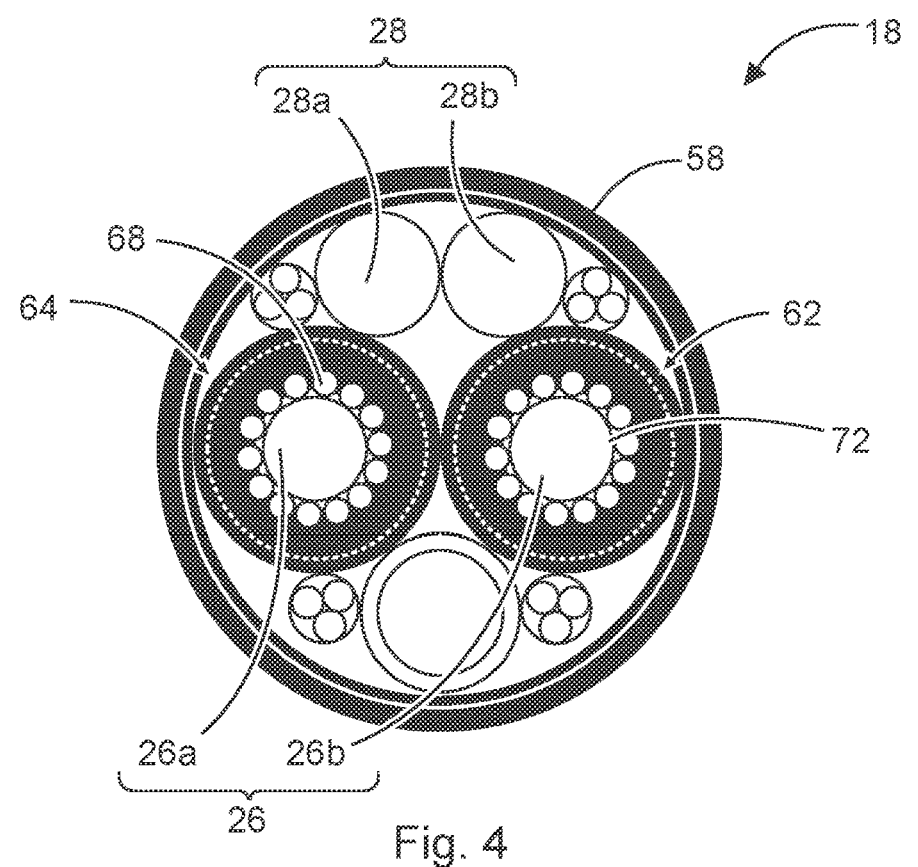
FIG. 4 is a cross section of a charging cable in accordance with the disclosure.

FIG. 4 shows an embodiment of a charging cable for the
electric charging system 10. The charging cable 18 com-
prises an outer cable sheath 58 for electrical insulation. In
the charging cable 18, two coolant supply lines 28a, 28b are
arranged forming the supply flow path 28. The cable 18
further comprises two electric power lines 62, 64 for pro-
viding electrical energy to an electrical vehicle. Each electric
power line 62, 64 comprises electric charging wires 68
arranged around an inner circle 72. The inner circles 72
provide coolant return lines 26a, 26b, forming the return
flow path 26. The coolant thereby is in direct contact with
the electric charging wires 68. An insulator 76, insulates
both power lines 62, 64 against each other.

By using an ionizable coolant during operation of the
electric vehicle charging system, the conductivity of the
coolant may increase, increasing the risk of a short circuit.
The deionizing unit thereby decreases the conductivity of
the coolant, so that also the risk for a short circuit is lowered.
Periodic replacement of the liquid coolant therefore can be
omitted, so that the electric charging system can be operated
more economically, while the maintenance requirements are
lowered. As the coolant is regularly deionized the electric
charging system can be operated at higher current without
running the risk of a short circuit. Further, as the risk for a
short circuit is minimized, safety of the vehicle charging
system is increased.

In one embodiment, the deionizing unit in view of the
coolant flow direction is arranged in series with the thermal
management unit for cooling the liquid coolant. In other
words, the thermal management unit and the deionizing unit
are arranged one after another. Thereby, the complete cool-
ant has to pass through both units. The advantage of this
arrangement is that the complete coolant pumped by the
coolant pump is used for cooling the cable and the charging
connector. Accordingly, this arrangement improves the cool-
ing effect.

In a further embodiment, the deionizing unit in view of
the coolant flow direction is arranged in parallel with a
thermal management unit for cooling the liquid coolant.
With this arrangement, only a part of the coolant flow is
directed to the deionizing unit. This is advantageous, as not
the whole coolant needs to be deionized in the deionizing
unit. Accordingly, the flow resistance induced by the deion-
izing unit is reduced. The electric vehicle charging system
therefore can be operated more economically.

Advantageously, upstream of the deionizing unit a con-
trollable valve is provided, for controlling the coolant flow
to the deionizing unit. The controllable valve can be in an opened, closed or intermediate position according to the
need for deionizing the coolant. Therefore, the deionizing
unit may be used from time to time, only. Thus, the flow
resistance in the electric vehicle charging system can be
further decreased. Apart from this, also the energy consump-
tion of the deionizing unit can be reduced. The electric
vehicle charging system therefore can be operated more
efficient.

In a further embodiment, for supplying the deionizing unit
with liquid coolant a separate pump is provided. In other
words, an additional pump to the pump of the cooling circuit
is provided. The separate pump preferably is arranged
upstream to the deionizing unit. This has the advantage that
the deionizing unit can be operated independently of the
cooling circuit. Therefore, it is possible to even operated the
deionizing unit if the cooling circuit is not operating. This
provides the possibility running a deionizing cycle of the
coolant between charging session. Accordingly, the flexibil-
ity of the electric vehicle charging system is increased.

Preferably, a conductivity measurement device is pro-
vided, for measuring a conductivity value of the liquid
coolant. The conductivity measurement device can be
arranged at any position of the cooling circuit. Preferably,
the conductivity measurement device is arranged in the
charging station. With the conductivity measurement device
the conductivity of the water can be monitored, so that the
deionizing unit can be controlled when deionizing of the
coolant is required. The conductivity measurement value is
continuously compared to a given conductivity threshold. As
the threshold e.g. can be reached during a charging session,
the charging session can be safely stopped or the flow rate
to the deionizing unit can be increase. The safety of the
electric vehicle charging system therefore can be improved.

For the liquid coolant, water or a mixture of water and
glycol is used. Although, water is an ionizable coolant it has
the advantage that due to the high heat capacity a large
amount of thermal energy can be stored. The heat manage-
ment of the coolant thereby can be improved, so that an
economical cooling of the cable and/or the charging con-
nector is possible.

In one embodiment, the liquid coolant is in direct contact
with the electrical charging wires of the cable and/or elec-
trical conductive parts of the charging connector. In other
words, the coolant is in physical contact with the electrical
charging wires respectively the electric conductive parts of
the charging connector. Compared to an arrangement where
the coolant merely cools a cable sheath of the electric cables,
the cooling effect is significant increased. The electric
vehicle charging system can be operated with a high power,
without exceeding a temperature threshold for the cables
respectively the charging connector. Accordingly, the effi-
ciency of the electric vehicle charging system can be
improved.

In another embodiment, the liquid coolant is in direct
contact with the electrical wires of the cable at a return flow
to the thermal management unit. Accordingly, the coolant
firstly cools the charging connected before the electrical
wires are cooled. As the charging connector is the most
critical part with respect to the generated heat, the charging
connector is cooled with the maximum cooling effect of the
coolant.

LIST OF REFERENCE NUMBERS 10 charging system
14 charging connector
18 charging cable 22 charging station
26 return flow path
26*a* coolant return line
26*b* coolant return line
28 supply flow path
28*a* coolant supply line
28*b* coolant supply line
30 thermal management unit
34 coolant tank
38 coolant pump
42 deionizing unit
46 conductivity measurement device
50 controllable valve
54 separate pump
58 outer cable sheath
62 electric power line
64 electric power line
68 electric charging wire
72 inner circle
76 insulator All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An electric vehicle charging system, comprising:
a charging connector configured to receive a charging cable provided with electrical charging wires, wherein the charging cable and/or the charging connector provide a flow path for guiding a liquid coolant, for cooling the charging cable and/or for cooling the charging connector; and
a thermal management unit configured to cool the liquid coolant, the thermal management unit being fluidly connected to the flow path;
wherein the liquid coolant is an ionizable coolant; and
wherein a deionizing unit is provided and is fluidly connected to the flow path for deionizing the liquid coolant, to decrease a conductivity of the coolant,
wherein the deionizing unit is positioned downstream of the thermal management unit along the flow path.

2. The electric vehicle charging system according to claim 1, wherein the deionizing unit in view of the coolant flow direction is arranged in series with the thermal management unit for cooling the liquid coolant.

3. The electric vehicle charging system according to claim 1, wherein the deionizing unit in view of the coolant flow direction is arranged in parallel with a thermal management unit for cooling the liquid coolant.

4. The electric vehicle charging system according to claim 3, wherein the deionizing unit includes a controllable valve that is configured for controlling a coolant flow to the deionizing unit.

5. The electric vehicle charging system according to claim 1, further comprising a separate pump configured for supplying the liquid coolant to the deionizing unit.

6. The electric vehicle charging system according to claim 1, further comprising a conductivity measurement device that is configured for measuring a conductivity value of the liquid coolant.

7. The electric vehicle charging system according to claim 1, wherein the liquid coolant is water.

8. The electric vehicle charging system according to claim 1, wherein the liquid coolant is in direct contact with the electrical charging wires of the charging cable and/or electrical conductive parts of the charging connector.

9. The electric vehicle charging system according to claim 8, wherein the liquid coolant is in direct contact with the electrical wires of the charging cable at a return flow path directed to the thermal management unit.

10. The electric vehicle charging system according to claim 6, wherein the conductivity measurement device is positioned upstream of the thermal management unit along the flow path.

11. The electric vehicle charging system according to claim 1, further comprising a coolant tank, wherein:
the flow path is a first flow path;
the electric vehicle charging system further comprises a second flow path separate from the first flow path and fluidly connected to the first flow path by the coolant tank; and
the deionizing unit is positioned in the second flow path.

* * * * *